(12) United States Patent
DeLanghe et al.

(10) Patent No.: US 9,688,177 B2
(45) Date of Patent: Jun. 27, 2017

(54) EXTENDABLE AND RETRACTABLE EDGE GUIDE

(75) Inventors: Ernest J. DeLanghe, Burnsville, MN (US); Paul Dathe, Plymouth, MN (US)

(73) Assignee: Caliber, Inc., Burnsville, MN (US)

( * ) Notice: Subject to any disclaimer, the term of this patent is extended or adjusted under 35 U.S.C. 154(b) by 332 days.

(21) Appl. No.: 13/158,645

(22) Filed: Jun. 13, 2011

(65) Prior Publication Data

US 2012/0315118 A1    Dec. 13, 2012

(51) Int. Cl.
*B60P 1/43* (2006.01)

(52) U.S. Cl.
CPC .................................. *B60P 1/435* (2013.01)

(58) Field of Classification Search
CPC . A61G 3/061; B60P 1/43; B60P 1/431; B60P 1/435
USPC ...... 414/229, 234, 228, 537; 296/61; 193/38
See application file for complete search history.

(56) References Cited

U.S. PATENT DOCUMENTS

| | | | | |
|---|---|---|---|---|
| 843,835 | A * | 2/1907 | McGinnis | 280/32 |
| 1,646,638 | A * | 10/1927 | Brennan | 37/264 |
| 2,341,866 | A * | 2/1944 | Higgins | 114/60 |
| 2,559,712 | A * | 7/1951 | Dobbs | 193/41 |
| 2,603,529 | A * | 7/1952 | Troth et al. | 296/61 |
| 2,906,212 | A * | 9/1959 | Hayes | 104/137 |
| 3,516,560 | A * | 6/1970 | Brighton | 414/537 |
| 3,737,058 | A | 6/1973 | Johnson | |
| 3,820,670 | A * | 6/1974 | Pizzo et al. | 414/227 |
| 4,144,979 | A * | 3/1979 | Leach et al. | 414/537 |
| 4,828,449 | A * | 5/1989 | Traylor | 414/462 |
| 4,874,284 | A | 10/1989 | New, Jr. | |
| 5,678,984 | A * | 10/1997 | Petersen | 414/537 |
| 5,769,593 | A * | 6/1998 | Buffaloe | 414/537 |
| 5,988,725 | A * | 11/1999 | Cole | 296/61 |
| 5,993,135 | A * | 11/1999 | Wolgamood | 414/537 |
| 6,164,882 | A | 12/2000 | Selle | |
| 6,543,985 | B1 * | 4/2003 | Harstad et al. | 414/537 |
| 6,634,848 | B2 * | 10/2003 | Henderson | 414/537 |
| 6,942,271 | B1 * | 9/2005 | Jamison et al. | 296/61 |
| 6,981,835 | B1 * | 1/2006 | Groth | 414/462 |
| 7,040,436 | B1 * | 5/2006 | Schounard | 180/182 |
| 7,082,637 | B1 * | 8/2006 | Griffin | 14/69.5 |
| 7,299,517 | B1 * | 11/2007 | Adinolfe | 14/69.5 |

(Continued)

*Primary Examiner* — Glenn Myers
(74) *Attorney, Agent, or Firm* — Peter J. Ims; Westman, Champlin & Koehler, P.A.

(57) ABSTRACT

A retractable guide for loading and unloading snowmobiles, ATVs and other equipment from a trailer or truck bed includes a first portion that is movable relative to a second portion that is fixedly attached to the truck or trailer bed such that the first portion pivotally moves relative to the second portion. The first portion is of a sufficient length such that when the first portion guide is in an extended position a distal edge of the first portion contacts the ground surface to provide a ramp for loading and unloading the ATV, snowmobile or other equipment. The ramp provides a smooth transition from the ground to the bed of the truck or trailer. Once the ATV, snowmobile or other equipment is loaded onto the bed of the trailer or truck, the first portion of the guide is pivotally positioned into a stowed position such that an end gate or other retaining wall can be positioned into a secured vertical position with the ATV, snowmobile or other equipment being positioned on the bed of the trailer or truck.

22 Claims, 11 Drawing Sheets

(56) References Cited

U.S. PATENT DOCUMENTS

| | | | |
|---|---|---|---|
| 7,806,639 B2* | 10/2010 | DeLanghe et al. | 410/67 |
| 7,832,975 B1* | 11/2010 | Mitchell | 414/537 |
| 7,926,139 B2* | 4/2011 | Metcalfe et al. | 14/69.5 |
| 8,061,754 B1* | 11/2011 | Webb | 296/61 |
| 8,123,455 B2* | 2/2012 | Chamoun | 414/537 |
| 8,256,053 B2* | 9/2012 | Astor et al. | 14/69.5 |
| 8,303,214 B2* | 11/2012 | Signaroldi | 405/166 |
| 8,561,238 B1* | 10/2013 | Inget | 14/71.1 |
| 2005/0036870 A1* | 2/2005 | Johansen | 414/538 |
| 2008/0303229 A1* | 12/2008 | Bowman et al. | 280/28 |
| 2009/0108614 A1* | 4/2009 | Washington | 296/61 |
| 2010/0068020 A1* | 3/2010 | Asfeld | 414/477 |
| 2010/0123330 A1* | 5/2010 | Watts et al. | 296/61 |
| 2012/0237331 A1* | 9/2012 | Gabrielson | 414/800 |

\* cited by examiner

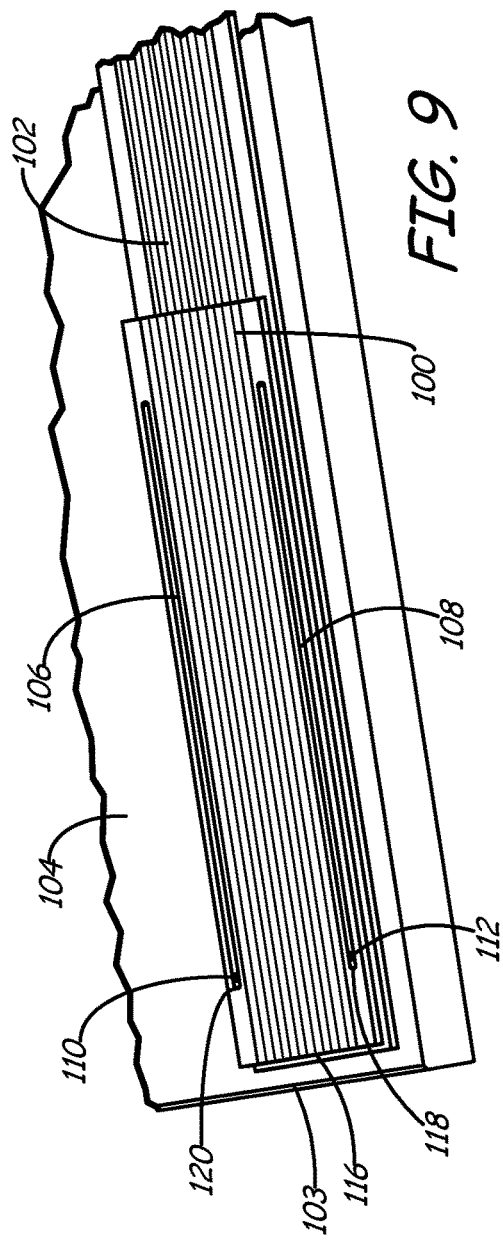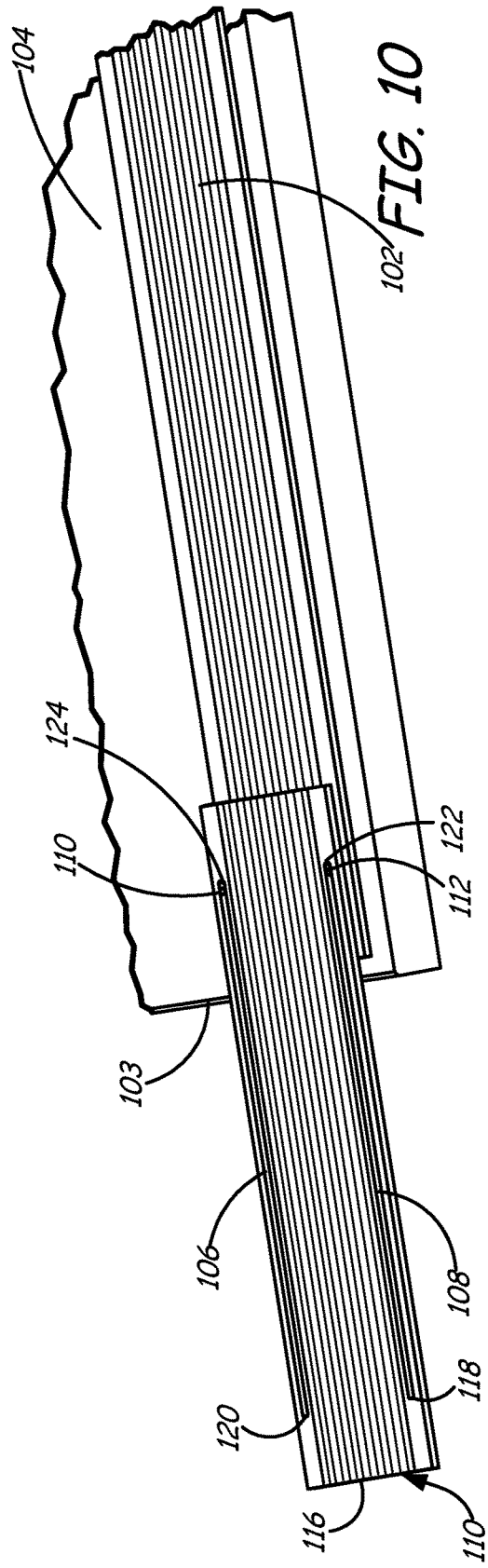

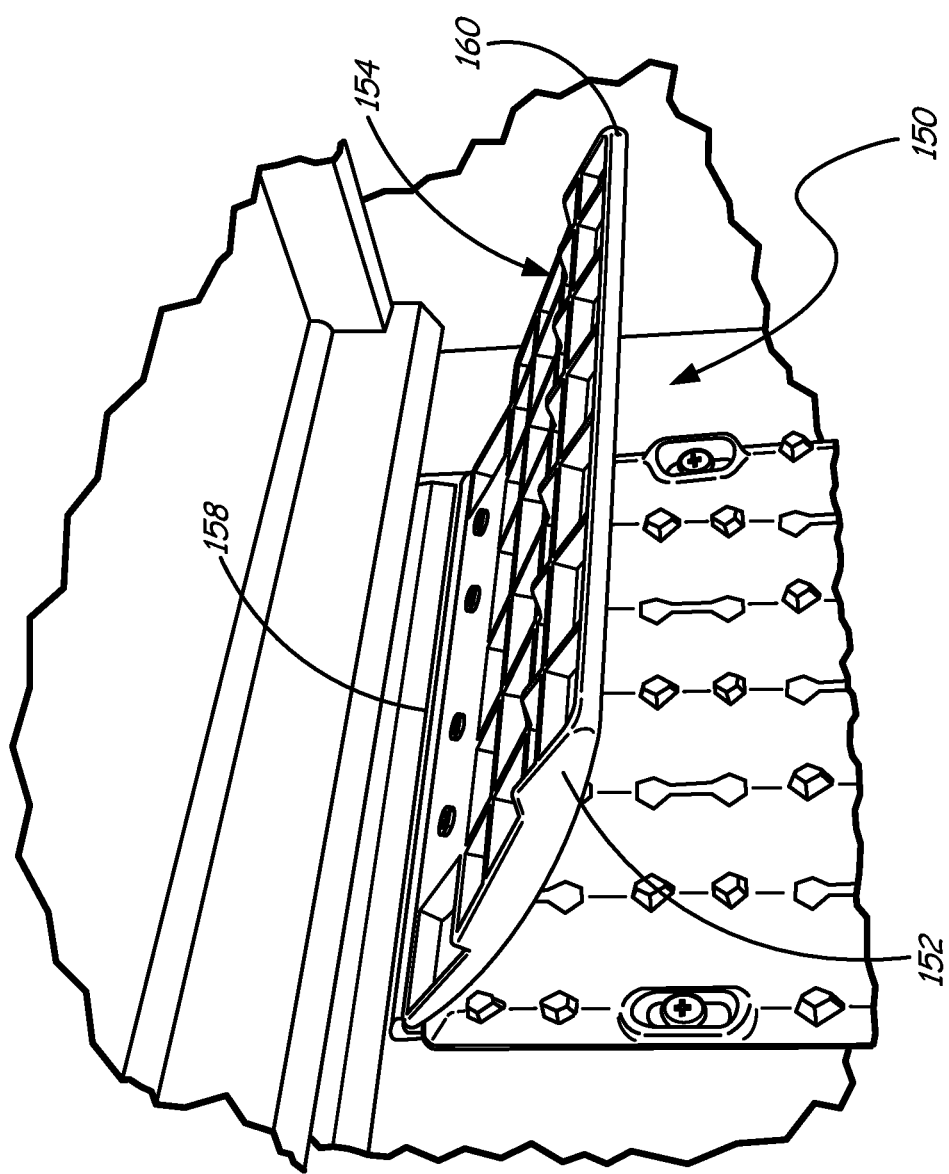

EXTENDABLE AND RETRACTABLE EDGE GUIDE

BACKGROUND

The present invention relates to a track guide that is secured a trailer bed or a truck bed and is extendable beyond an edge of the trailer or truck bed. More particularly, the present invention relates to a track guide that is attached proximate an end of a trailer bed or a truck bed wherein a first portion of the track guide is extendable beyond the edge of the trailer or truck bed to provide a transition between ground level and the edge of the trailer or truck and retractable to a stored position.

Vehicles and equipment, including but not limited to, snowmobiles, all-terrain vehicles (ATVs), lawn mowers, lawn tractors and snow blowers are typically transported to and from a location on a trailer bed or a truck bed. However, at times, it is difficult to transition the vehicle and equipment from the ground level to the bed of the trailer or truck when there is a distance between the edge of the bed and ground level.

When the distance between the edge of the bed and ground level is greater than about one-third of the diameter of a wheel of an ATV or other wheeled vehicle or equipment, attempting to load an ATV or other wheeled vehicle or equipment onto the bed for transport can be difficult because the ATV tires will contact the back edge of the bed and not be able to climb onto the bed without manual assistance. Due to the weight of the equipment or vehicle, attempting to lift the equipment or vehicle with manual force, such that the tires climb onto the bed, can be a difficult and/or dangerous undertaking to accomplish.

The same issue arises when attempting to drive a snowmobile onto a truck or trailer bed. The snowmobile typically has spaced apart skis with two metal runners attached to the side edges of each ski. If the distance between the ground surface and the bed is sufficiently large so that the skis cannot climb on to the bed, the operator has to attempt to lift and push forward the snowmobile such that the skis are positioned on the bed. This activity can be a difficult and hazardous undertaking to accomplish.

It can also be difficult to lift heavy or bulky items such as, but not limited to, furniture or storage crates onto a bed of a trailer or truck due to the weight or configuration of the item. Utilizing a ramped surface from the ground level to the bed of the truck or trailer can aid in safely moving the items onto the bed for transport to a different location.

SUMMARY

One aspect of the present invention relates to an extendable and retractable guide for loading and unloading snowmobiles, ATVs and other equipment from a trailer or truck bed. The extendable and retractable edge guide typically includes a first portion that is movable relative to a second portion that is fixedly attached to the truck or trailer bed such that the first portion pivotally moves relative to the second portion. The guide includes a plurality of spaced apart ridges that define channels therebetween wherein the runners of the ski are positionable in the channels and are guided by the ridges onto and off of the bed. The tires of the ATV or other wheeled item grip the top surface of the guide such that the ATV or other wheeled item can be driven from ground level and onto the bed. The first portion is of a sufficient length such that when it is in an extended position, a distal edge of the first portion contacts the ground surface to provide a ramp for loading and unloading the ATV, other wheeled item or snowmobile. The ramp provides a smooth transition from the ground to the bed of the truck or trailer. Once the ATV, other wheeled item or snowmobile is loaded onto the bed of the trailer or truck, the first portion of the guide is pivotally positioned into a stowed position such that an end gate or other retaining wall can be positioned into a secured vertical position with the ATV, other wheeled item or snowmobile being positioned on the bed of the trailer or truck.

In another aspect, the edge guide can include a first portion slidably attached to the second portion where the second portion is fixedly attached to the bed. The moveable first portion is extendable beyond the edge of the bed such that the distal end of the first portion contacts the ground surface and provides a ramp for smoothly transitioning a ski of a snowmobile or a tire of an ATV or other wheeled item from the ground level to the bed of the trailer or truck. Once the ATV, other wheeled item or snowmobile is positioned on the bed, the slidable edge glide is slidably positioned into a retractable position such that the end of the edge glide is even with or positioned behind the edge of the bed of the trailer or truck.

BRIEF DESCRIPTION OF THE DRAWINGS

FIG. 9 is a partial perspective view of a slideable edge guide in a stowed position.

FIG. 10 is a partial perspective view of a slideable edge guide in an extended position.

FIG. 12 is a perspective view of the integral or monolithic edge guide in a stowed position.

DETAILED DESCRIPTION OF ILLUSTRATIVE EMBODIMENTS

Figure 1:
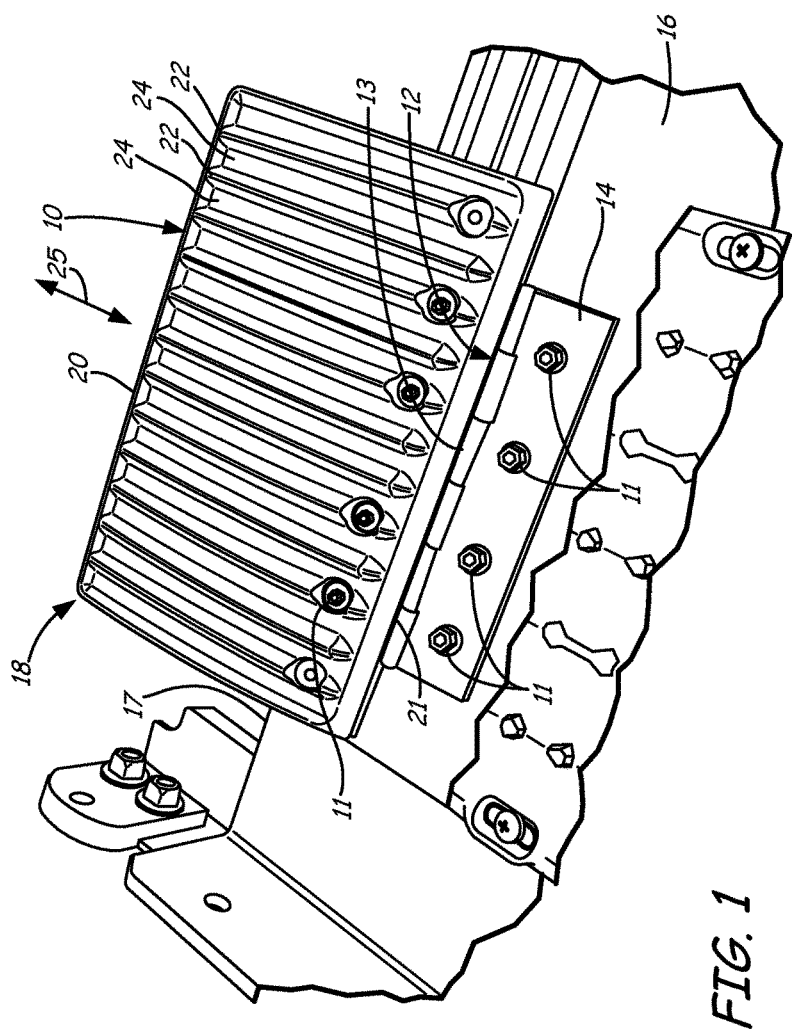
FIG. 1 is a perspective view of a hingedly attached edge guide attached to a bed.

An extendable and retractable edge guide is generally illustrated in FIG. 1 at 10. The edge guide 10 includes a hinge 12 having a first plate 14 attached to bed 16 of a trailer or truck. A guide portion 18 of the edge guide 10 is attached to a moveable second plate 13 of the hinge 12. Typically, the first plate 14 is attached to the bed 16 and the second plate 13 is attached to the guide portion 18 with nuts and bolts 11. However, other fastening mechanisms are also contemplated.

The guide portion 18 is positionable into an extended position as illustrated in FIG. 1 where a distal edge 20 of the guide 10 extends beyond an edge 17 of the bed 16 and contacts the ground. The guide 10 can also be pivoted into a stowed position such that the distal end 20 of the guide 10 is even with or in front of the edge 17 of the bed 16, as best illustrated in FIG. 3.

The guide portion 18 is typically a monolithic construction where the guide portion 18 is typically formed from a molded thermoplastic material through a molding process. The guide portion 18 typically includes a plurality of parallel raised ridges 22 that extend from the distal end 20 to the proximal end 21 and in a direction of travel of a ski or a tire of an ATV and indicated by arrows 25. A plurality of channels 24 that separate the raised ridges 22 accept runners on a ski of a snowmobile such that the side edges adjacent the ridges 22 guide the ski upwards and into the bed 16 of the trailer or truck and prevents lateral movement of the ski.

Figure 2:
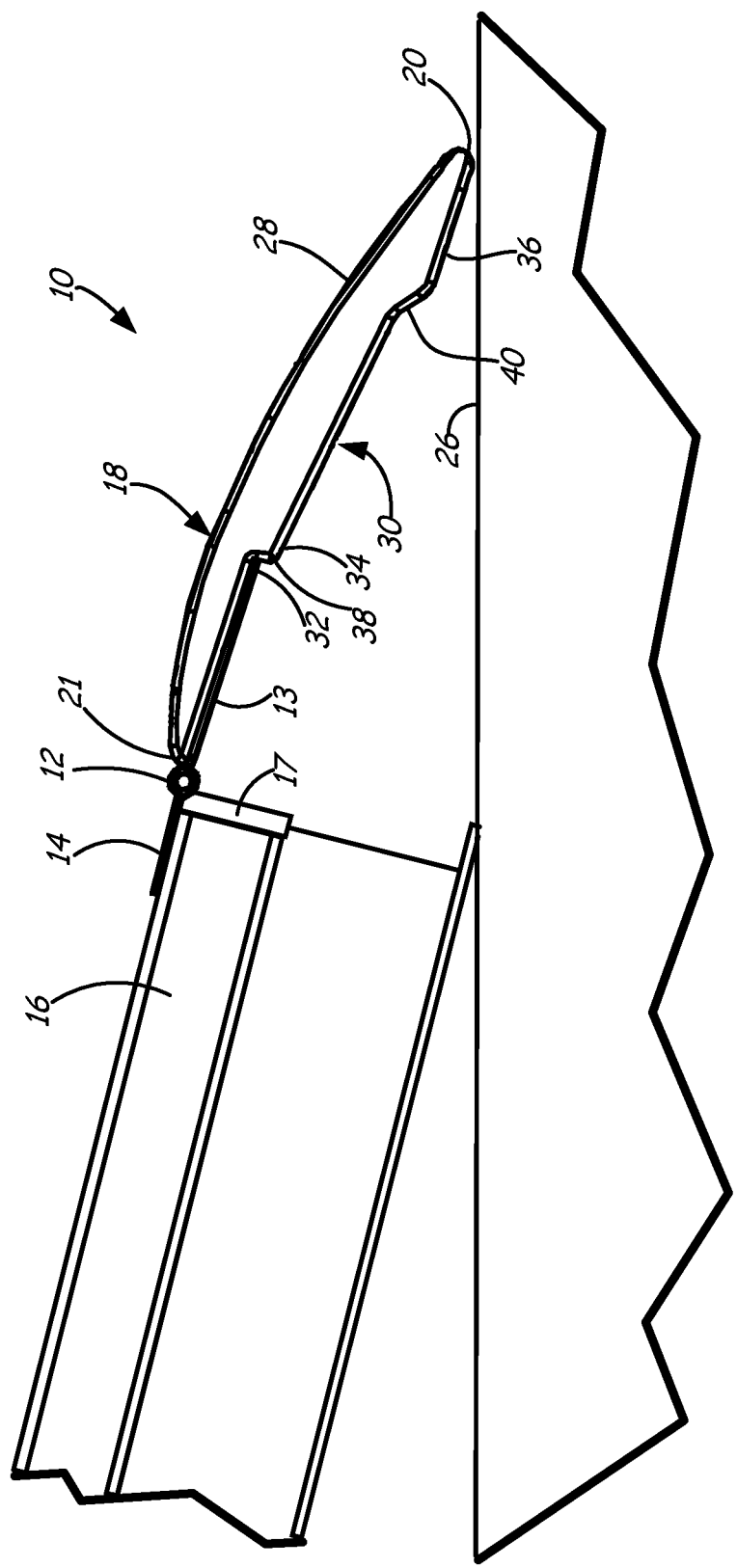
FIG. 2 is a sectional view of a hingedly attached edge guide attached to a bed where the edge guide is in an extended position.

Referring to FIG. 2, the guide portion 18 is of a sufficient length such that the distal end 20 of the guide portion 18, when in an extended position, contacts the ground level 26 and provides a ramped surface from the ground level 26 to the bed 16 of the trailer or truck. The guide portion 18 typically includes an arcuate top surface 28 and a bottom surface 30 that has a plurality of flat surfaces 32, 34 and 36 that are separated by shoulders 38 and 40. The flat surfaces 32, 34 and 36 and shoulders 38, 40 provide rigidity to the guide 10 as compared to a flat bottom surface. The arcuate top surface 28 also provides structural integrity and resists bending as the weight of the ATV, snowmobile or other item moves over the guide portion.

Figure 3:
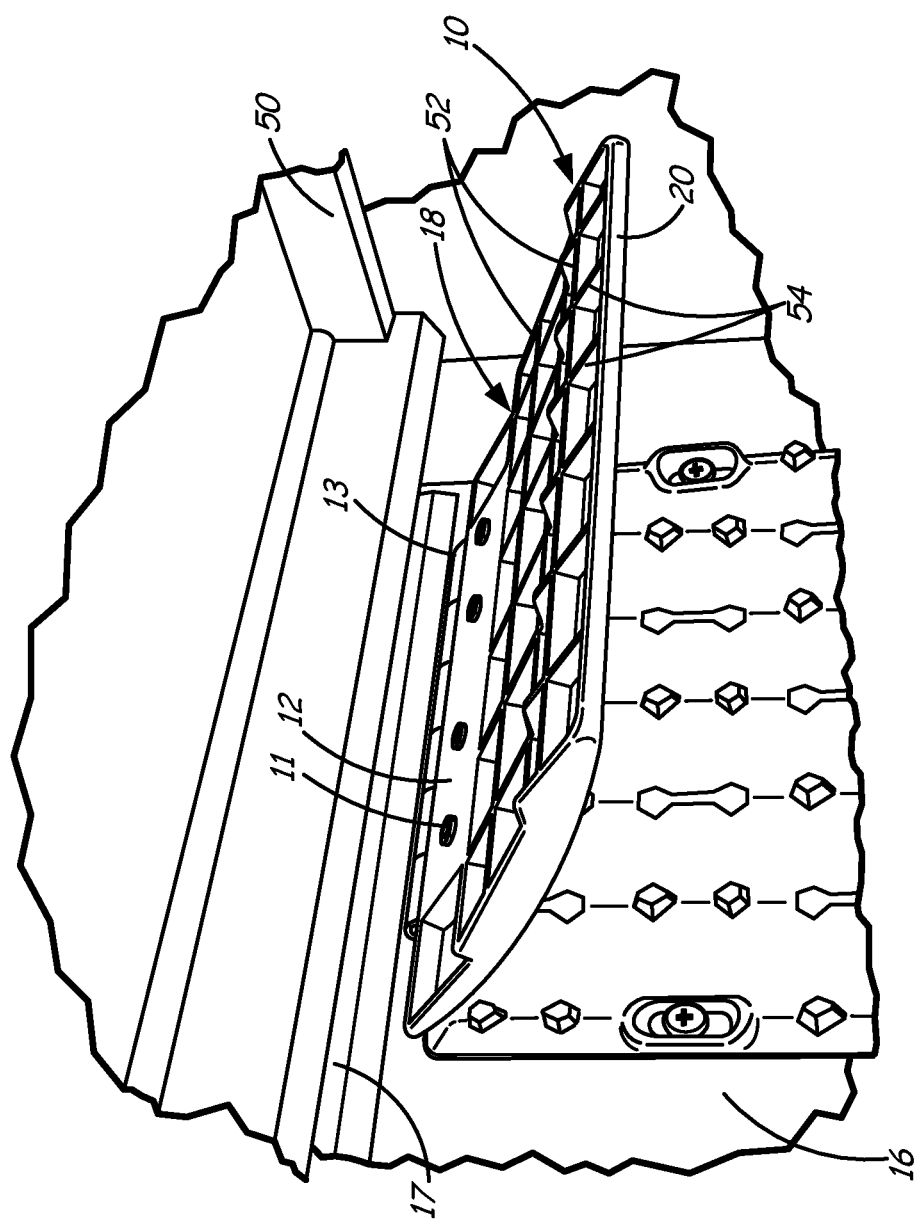
FIG. 3 is a perspective view of the edge guide in a stowed position.

Referring to FIG. 3, the guide portion 18 is illustrated in a stowed position or stowed position where the distal end 20 of the guide portion 18 is in front of the distal edge 17 of the bed 16 such that an end gate 50 can be raised to secure the ATV, snowmobile or other item onto the bed of the trailer or truck. The end gate 50 prevents items from accidentally falling out of the bed and acts as a safety device to retain the ATV or snowmobile on the bed.

The interior of the guide portion 18 includes a plurality of horizontal ribs 52 and vertical ribs 54 which create a grid pattern that increases the structural integrity of the guide portion 18. The ribs 54 provide rigidity and assist in preventing the guide portion 18 from flexing when loading and unloading of the ATV and/or snowmobile.

Figure 4:
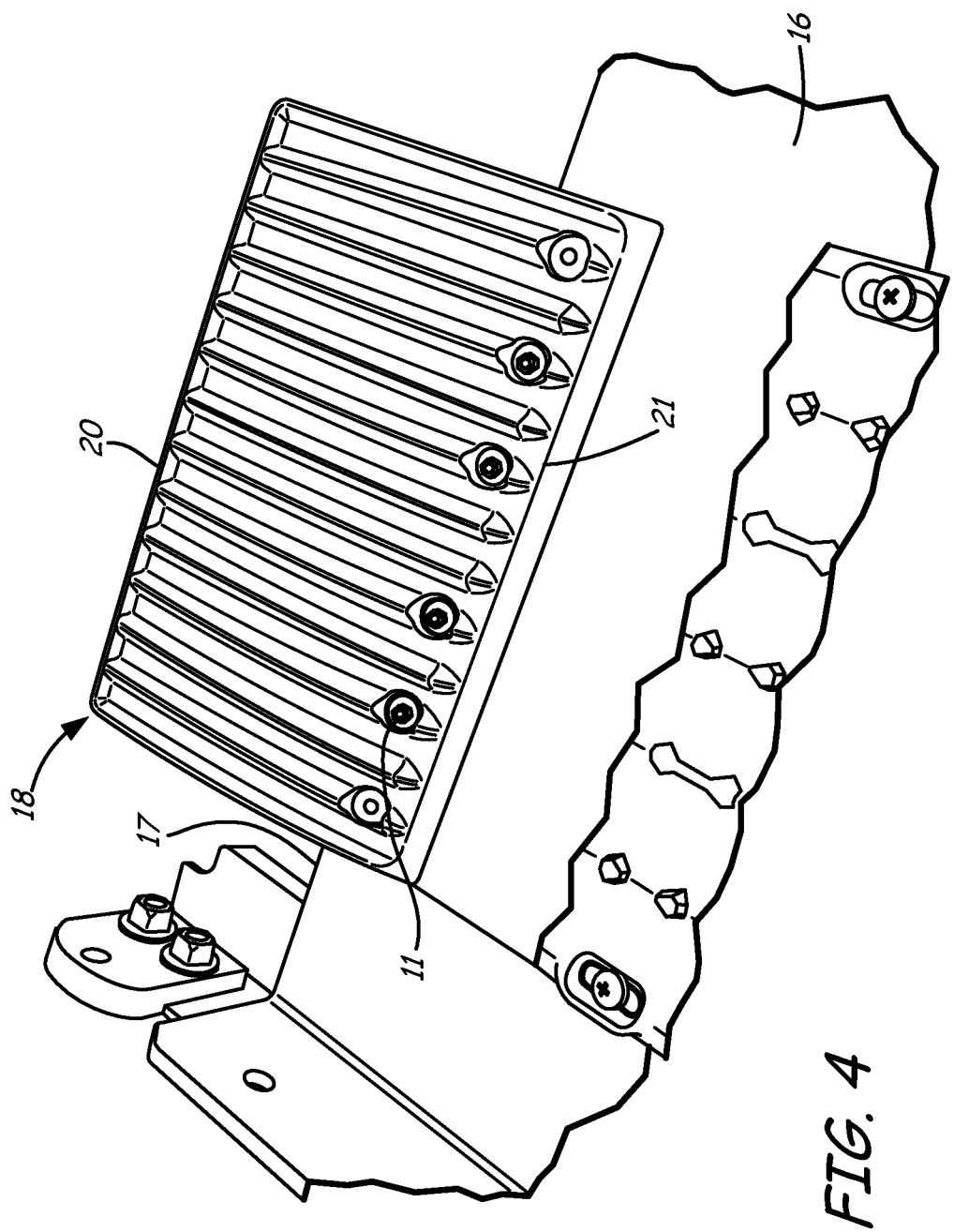
FIG. 4 is a perspective view of an edge guide attached to a bed or tailgate.
Figure 5:
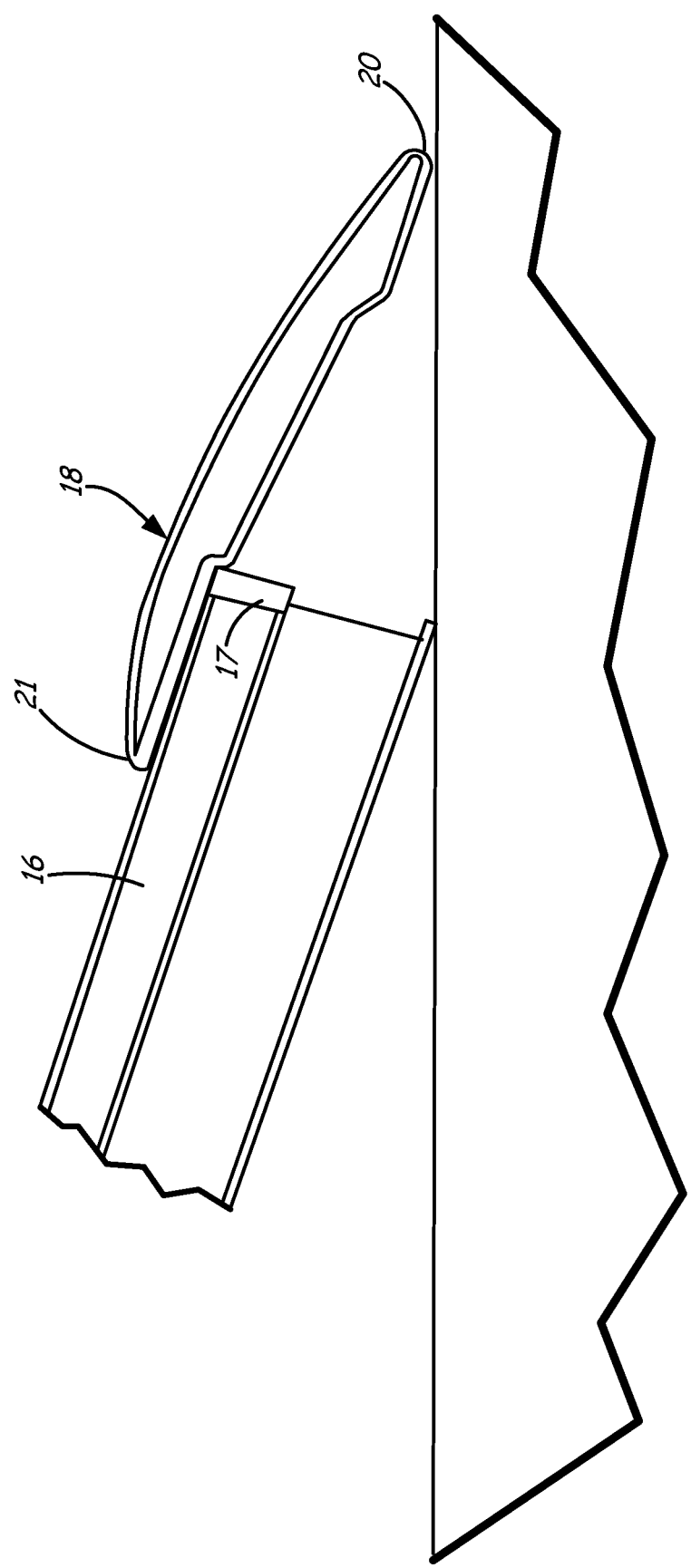
FIG. 5 is a sectional view the edge guide attached to the bed or tailgate where the bed or tailgate is lowered such that the edge guide contacts the ground.

Referring to FIGS. 4 and 5, it is also contemplated to attach a proximal end 21 of the guide portion 18 directly to the bed 16 of the trailer or truck with bolts 11 such that the distal end of the 20 of the guide portion 18 extends beyond the back edge 17 of the bed 16. The bed 16 can pivotally move to lower the back edge 17 of the bed 16 such that the distal end 20 of the guide portion contacts the ground as illustrated in FIG. 5. It is also contemplated that the guide portion 18 can be directly attached to a tailgate that pivotally moves relative to the bed 16 such that the distal end 20 of the guide portion 18 contacts the ground level.

Figure 6:
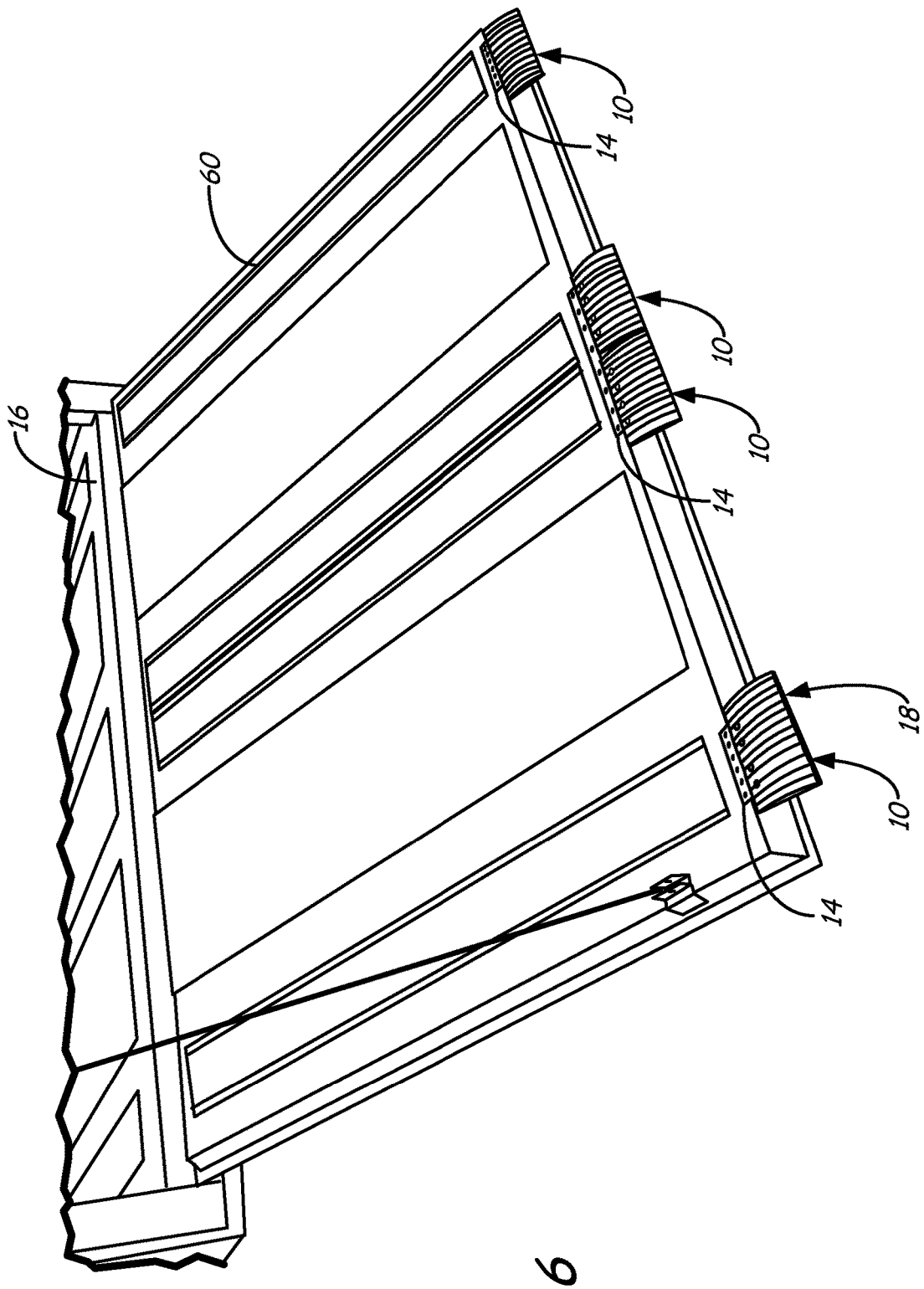
FIG. 6 is a perspective view of a slideable edge guide in an extended position and sharing a common hinge.

Referring to FIG. 6, guide portions 18 are illustrated in an extended position where each guide portion 18 is moveably attached to a hinge 12 that is secured proximate a back edge of a tailgate 60. The edge guides 10 are positioned on the tailgate 60 at a spacing such that two ATVs or snowmobiles can be loaded onto the bed 16 as the edge guides are at positions that accept commonly spaced apart snowmobile skis and/or ATV tires.

Figure 7:
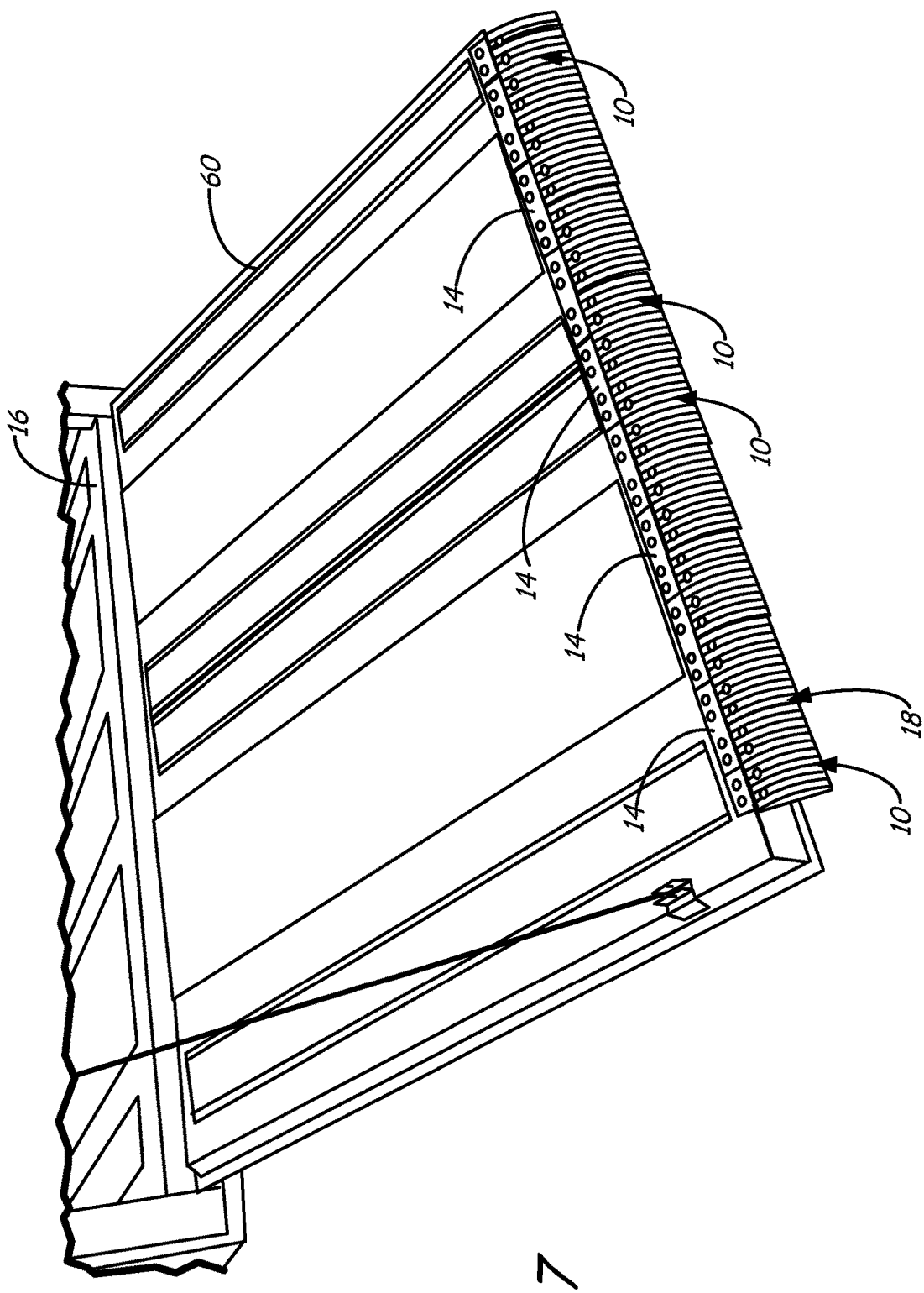
FIG. 7 is a perspective view of interconnected edge guides positioned across a back edge of a bed or tailgate.

The middle edge guides 10 are illustrated as being secured to the end gate 60 with a common hinge 14. Common hinges 14 can be utilized on opposite ends of each edge guide 10, besides the opposite edge end guides 10 where only one common hinge 14 would be utilized, such that the entire back edge has interconnected edge guides 10 that are movable together from the extended position to the stowed position and back as illustrated in FIG. 7.

Figure 8:
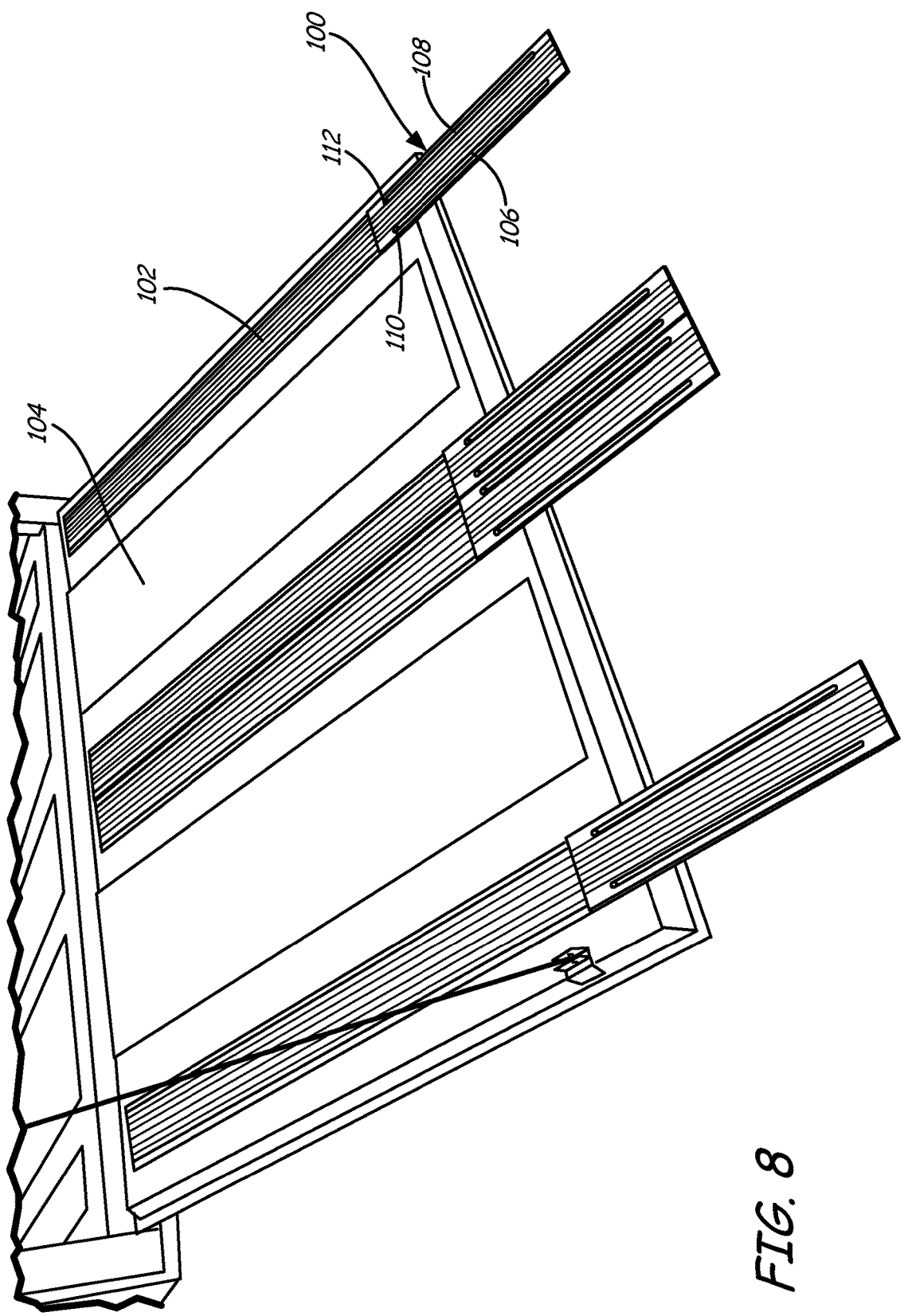
FIG. 8 is a perspective view of a slideable edge guides attached to a tailgate.

Referring to FIG. 8, another extendable and retractable edge guid is illustrated at 100. Each edge guide 100 includes a top sliding portion 101 that is slidably attached to a bottom base 102 where each base 102 is fixedly attached to a surface of a bed 104. The top portion 101 includes left and right slots 106 and 108 that extend substantially along a length of the top sliding portion 101 proximate side edges. The slots 106 and 108 cooperate with left and right guide pegs 110 and 112, respectively, that extend upwardly from the base 102 that allow the top sliding portion 101 to slideably move with respect to the base 102.

Referring to FIG. 9, the first portion 101 is illustrated in a stowed position where a distal end 116 is positioned in front of the back edge 103 of the bed 104. In the stowed position, an end gate can be raised such that the snowmobile or ATV cannot accidentally slide out the back of the bed 104. In the stowed position, the distal ends 118 and 120 of the lots 106, 108 contact the guide pegs 110 and 112, all respectively.

Referring to FIG. 10, the top sliding portion 101 of the edge glide 100 is illustrated in an extended position where the distal edge 116 contacts a ground surface to provide a smooth ramped surface for loading and unloading a snowmobile or ATV. With the distal edge 116 contacting the ground, the distal edge 106 of the first portion 101 is behind the distal edge 103 of the bed 104. In the extended position, the guide pegs 110 and 112 contact the proximal ends 122 and 124 of the slots 106 and 108, respectively. In the extended position, the guide pegs 110 and 112 can optionally be manipulated to retain the first portion 101 in the selected position such that when the ski or tire contacts the portion 101, the portion 101 does not move along with the ski and/or tire.

Figure 11:
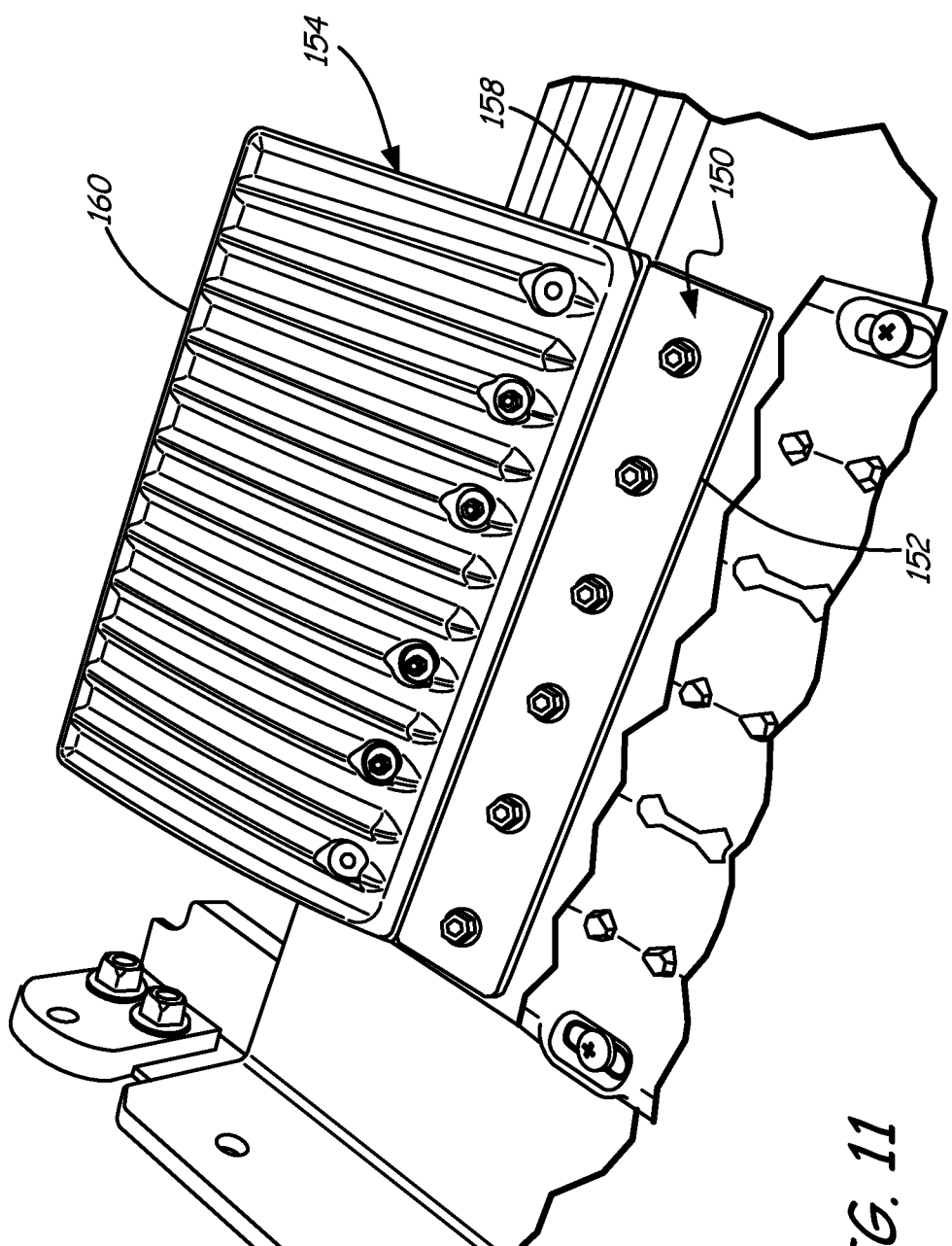
FIG. 11 is a perspective view of an integral or monolithic edge guide in an extended position.

Referring to FIG. 11, another edge guide is illustrated at 150. The edge guide 150 is of a monolithic construction having a bed engaging portion 152 and a ramp portion 154 that are attached with a living hinge 158. The ramp portion 154 has a configuration similar to that of the guide portion 18 of the edge guide 10. The living hinging mechanism 158 allows the ramp portion 154 to flex from a loading position where a distal end 160 contacts the ground to a stowed position where the distal end 160 of the ramp portion 154 is in front of the back edge of the bed as illustrated in FIGS. 11 and 12, respectively.

Although the present invention has been described with reference to preferred embodiments, workers skilled in the art will recognize that changes may be made in form and detail without departing from the spirit and scope of the invention.

What is claimed is:

1. An apparatus for loading and unloading a snowmobile onto a bed of a truck or trailer in a direction of travel, the snowmobile having spaced apart skis with runners extending from bottom surfaces thereof, the apparatus comprising:
    a first portion configured to be fixedly and non-movably attached to a top surface of the bed of the truck or the trailer proximate a back edge thereof with one or more securing mechanisms such that the first portion is stationary with respect to the bed when the one or more securing mechanisms engages the bed; and
    a second portion configured to be in communication with the first portion and configured to be movably retained in a plane substantially parallel to the direction of travel and to substantially prevent movement in a direction substantially normal to the direction of travel, wherein the second portion comprises a proximal end positioned proximate the first portion when the second portion is retained to the first portion and a distal end,
wherein the second portion is positionable between:
a first loading position wherein the distal end extends beyond the back edge of the bed and engages a ground surface, and
a second stowed position wherein the distal end is even with or in front of the back edge of the bed, and
wherein the second portion wherein the second portion is of a monolithic construction and comprises an upper surface comprising a plurality of raised ribs and a plurality of channels,
wherein adjacent raised ribs of the plurality of raised ribs are separated by a channel of the plurality of channels,
wherein the raised ribs and the channels extend from proximate the proximal end to proximate the distal end and in a direction of travel of the snowmobile, and
wherein the plurality of raised ribs are configured to engage at least one of the spaced apart skis and one the plurality of channels is configured to accept the runner of the at least one spaced apart ski such that lateral movement of the ski is prevented.

2. The apparatus of claim 1 wherein the second portion pivots between the first loading position and the second stowed position.

3. The apparatus of claim 2 and wherein the first portion comprises a first plate of a hinge and wherein a second plate of the hinge attaches to the second portion.

4. The apparatus of claim 1 wherein the first portion and second portion are of a monolithic construction wherein the apparatus flexes between the first and second portions such that the second portion is positionable between the first loading position and the second stowed position.

5. The apparatus of claim 4 wherein a channel separates the first portion and the second portion and wherein a bottom surface of the channel flexes when the second portion is positioned between the first loading position and the second stowed position.

6. The apparatus of claim 1, wherein the upper surface of the second portion comprises an arcuate configuration that extends from proximate the distal end to proximate the proximal end.

7. The apparatus of claim 6, wherein the second portion includes first and second sides and a bottom surface, and wherein the second portion comprises a plurality of spaced apart longitudinal ribs extending from the bottom surface and positioned from proximate the distal end to proximate the proximal end and a plurality of spaced apart transverse ribs extending from the bottom surface and positioned from proximate the first side to proximate the second side such that the second portion includes a grid structure extending from the bottom surface.

8. The apparatus of claim 1 and wherein the first portion comprises spaced apart pegs extending upwardly therefrom.

9. The apparatus of claim 8 and wherein the second portion comprises spaced apart slots of a selected length wherein the pegs are positioned through the slots such that the second portion slidably moves relative to the first portion.

10. An apparatus configured to load and unload a snowmobile onto a bed of a truck or trailer in a direction of travel, the snowmobile having spaced apart skis with runners extending from bottom surfaces thereof or to provide a surface for loading and unloading a vehicle onto the bed, the apparatus comprising:
a guide configured to be movably attached to the bed of the truck or trailer with a proximal end proximate a first portion of the guide and a distal end proximate a second portion of the guide,
wherein the first portion is configured to be non-movably secured to a top surface of the bed of the truck or the trailer with one or more securing mechanisms such that the first portion is stationary relative to the bed when the securing mechanisms engage the bed, and
wherein the second portion is positionable and retained in a plane substantially parallel to the direction of travel between
a first loading position wherein the distal end extends beyond a back edge of the bed and engages a ground surface, and
a second stowed position wherein the distal end is even with or in front of the back edge of the bed,
wherein the second portion comprises a first edge and a second edge that are substantially transverse to the direction of travel of the snowmobile or vehicle, wherein an upper surface extends from the first edge to the second edge, and wherein the upper surface is substantially arcuate from proximate the first edge to proximate the second edge, and
wherein the second portion is of a monolithic construction.

11. The apparatus of claim 10 and wherein the second portion comprises a plurality of raised ribs separated by a plurality of channels that extend from proximate the first edge to proximate the second edge, wherein the plurality of raised ribs are configured to engage at least one of the spaced apart skis and one of the plurality of channels is configured to accept the runner of the at least one spaced part ski such that lateral movement of the ski is prevented.

12. The apparatus of claim 10 wherein the guide pivotally moves relative to the bed between the first loading position and the second stowed position.

13. The apparatus of claim 12 wherein the guide is of a monolithic construction and comprises a first portion and a second portion wherein the guide flexes between the first and second portions such that the second portion is positionable between the first loading position and the second stowed position.

14. The apparatus of claim 13 wherein a channel separates the first portion and the second portion and wherein a bottom surface of the channel flexes when the second portion is positioned between the first loading position and the second stowed position.

15. The apparatus of claim 12 and wherein the guide attaches to the bed with a hinge, wherein a first plate of the hinge attaches to the bed, and wherein a second plate of the hinge attaches to the guide.

16. An apparatus configured to load and unload a snowmobile onto a bed of a truck or trailer, the snowmobile having spaced apart skis with runners extending from bottom surfaces thereof or to provide a surface for loading and unloading a vehicle onto the bed, the apparatus comprising:
a guide movably attached to the bed of the truck or trailer with a proximal end proximate a first portion of the guide and a distal end proximate a second portion of the guide, wherein the first portion is secured to the bed of the truck or the trailer with a plurality of securing mechanisms, and wherein the second portion is positionable between a first loading position wherein the distal end extends beyond a back edge of the bed and engages a ground surface and a second stowed position wherein the distal end is even with or in front of the back edge of the bed, wherein the second portion comprises a first edge and a second edge that are substantially transverse to a direction of travel of the snowmobile or vehicle, wherein an upper surface extends from the first edge to the second edge, and wherein the upper surface is substantially arcuate from proximate the first edge to proximate the second edge and wherein the second portion configured to be in communication with the first portion and configured to be movably retained in a plane substantially parallel to the direction of travel and to substantially prevent movement in a direction substantially normal to the direction of travel, wherein the second portion is of a monolithic construction.

17. An apparatus for loading and unloading a snowmobile onto a bed of a truck or trailer in a direction of travel, the snowmobile having spaced apart skis with runners extending from bottom surfaces thereof, the apparatus comprising:

a first member configured to be fixedly and non-movably attached to a top surface of the bed of the truck or the trailer proximate a back edge thereof with one or more securing mechanisms such that the first portion is stationary with respect to the bed when the one or more securing mechanism is secured to the bed;

a second member comprising a main body comprising a monolithic structure with a proximal end and a distal end, wherein the proximal end and the distal end intersect in a plane wherein at least a portion of an upper surface of the main body extends above the plane; and an intermediate member configured to be non-movably retained to the second member and pivotally connected to the first member, wherein when the intermediate member is pivotally connected to the first member, the second member is positionable between a first loading position wherein the distal end extends beyond the back edge of the bed and engages a ground surface, and a second stowed position wherein the distal end is even with or in front of the back edge of the bed wherein the second portion configured to be movably retained in a plane substantially parallel to the direction of travel and to substantially prevent movement in a direction substantially normal to the direction of travel.

18. The apparatus of claim 17 and wherein the monolithic structure is molded.

19. The apparatus of claim 18 and wherein the main body comprises a polymeric material.

20. The apparatus of claim 17 and wherein the upper surface comprises an arcuate surface extending from proximate the proximal end to proximate the distal end.

21. The apparatus of claim 17 and further comprising a pin wherein the pin pivotally connects the first portion and the intermediate portion.

22. The apparatus of claim 17 and wherein an entire upper surface of the second member extends above the plane.

* * * * *